United States Patent
D et al.

(10) Patent No.: US 10,547,622 B2
(45) Date of Patent: *Jan. 28, 2020

(54) EXTENDED OAUTH ARCHITECTURE SUPPORT IN A SCALABLE ENVIRONMENT

(71) Applicant: INTERNATIONAL BUSINESS MACHINES CORPORATION, Armonk, NY (US)

(72) Inventors: Manjunatha D, Bangalore (IN); Sowmya H. Dayananda, Bangalore (IN)

(73) Assignee: International Busines Machines Corporation, Armonk, NY (US)

(*) Notice: Subject to any disclaimer, the term of this patent is extended or adjusted under 35 U.S.C. 154(b) by 280 days.

This patent is subject to a terminal disclaimer.

(21) Appl. No.: 15/638,968

(22) Filed: Jun. 30, 2017

(65) Prior Publication Data

US 2019/0007419 A1  Jan. 3, 2019

(51) Int. Cl.
*G06F 21/00* (2013.01)
*H04L 29/06* (2006.01)
*G06F 21/31* (2013.01)

(52) U.S. Cl.
CPC ........ *H04L 63/108* (2013.01); *H04L 63/0807* (2013.01); *G06F 21/31* (2013.01)

(58) Field of Classification Search
CPC ..... H04L 63/10; H04L 63/08; H04L 63/0815; H04L 63/0807; H04L 67/02; H04L 63/20; H04L 63/0853
See application file for complete search history.

(56) References Cited

U.S. PATENT DOCUMENTS

| 2015/0089569 A1* | 3/2015 | Sondhi .................... H04L 63/08 726/1 |
| 2016/0028737 A1* | 1/2016 | Srinivasan .......... H04L 63/0807 726/1 |
| 2016/0080383 A1 | 3/2016 | Hockings et al. |
| 2016/0164878 A1* | 6/2016 | Nakano ................. H04L 63/102 726/4 |

OTHER PUBLICATIONS

Hammer-Lahav, E.; The Oauth 1.0 Protocol; Internet Engineering Task Force; Request for Comments 5849; http://tools.ietf.org/html/rfc5849; Apr. 2010; 38 pages.

* cited by examiner

*Primary Examiner* — Ghazal B Shehni
(74) *Attorney, Agent, or Firm* — Schmeiser, Olson & Watts; Michael A. Petrocelli

(57) ABSTRACT

An approach is provided for sharing valid token(s) across application instances. If refresh token rotation is used, (i) a token request is received which includes a number of tokens required, (ii) access and refresh token pairs are generated and shared so that a total number of the pairs equals the number of tokens, and (iii) the access and refresh token pairs are sent to a client so that in response to token requests, the application instances obtain respective access and refresh token pairs. If refresh token rotation is not used, (iv) a request for a refresh token is received, (v) an existing access token is validated, where the access token is bound to the refresh token, and (vi) if the existing access token is expired, a new access token is generated and sent to the client; otherwise, the existing access token is sent to the client.

9 Claims, 8 Drawing Sheets

EXTENDED OAUTH ARCHITECTURE SUPPORT IN A SCALABLE ENVIRONMENT

BACKGROUND

The present invention relates to managing information technology systems and software, and more particularly to extending an authorization standard in a scalable environment.

The OAuth 2.0 specification defines a framework that enables a third party application to obtain limited access to a service, either on behalf of a resource owner by coordinating an approval interaction between the resource owner and the service, or by allowing the third party application to obtain access on its own behalf.

By default, a current OAuth 2.0 framework implementation ensures that (i) an access token is associated with a given refresh token and (ii) the access token has limited validity and is invalid when expired or refreshed using the refresh token.

In a cloud or cloud integration environment, it is common to bring up multiple instances of an application to support load balancing and fail over, where each instance shares the copy of the access token and the refresh token. In some situations, multiple applications can use copies of the access and refresh tokens. Thus, each instance must have a logic to refresh the token if the token is expired or invalidated. In such an environment, refreshing token(s) by an instance or application leads other instances or applications to have invalid token(s) because tokens are shared across instances. In such situations, each and every instance should obtain a token refreshed to make a valid request. Furthermore, these situations may result in the instance or application holding an invalid token indefinitely, which leads to an application failure, an increased load on the server, and/or a decrease in throughput of the server and the application.

SUMMARY

In one embodiment, the present invention provides a method of sharing one or more valid tokens across multiple instances of an application in a dynamically scalable environment The method includes if a computer issues a corresponding new refresh token for each request for a refresh of each access token, the computer (i) receives a token request from a client interacting with instances of an application, where the token request includes a field indicating a number of tokens required for the instances of the application, (ii) in response to the token request being received, generates and shares access and refresh token pairs so that a total number of the access and refresh token pairs equals the number of tokens included in the token request, and (iii) sends the access and refresh token pairs to the client so that in response to token requests from the instances of the application, the instances of the application obtain respective access and refresh token pairs. The computer includes an authorization server. The client is another computer. The number of tokens is an integer greater than one. Furthermore, if the computer does not issue the corresponding new refresh token for each request for the refresh of each access token, the computer (iv) receives from the client a request for a refresh token, (v) in response to the request for the refresh token being received, validates an existing access token which is bound to the refresh token, and (vi) in response to the existing access token being validated, if the existing access token is expired, generates and sends to the client a new access token, or if the existing access token is not expired, sends to the client the existing access token.

In another embodiment, the present invention provides a computer program product including a computer-readable storage medium and a computer-readable program code stored in the computer-readable storage medium. The computer-readable program code includes instructions that are executed by a central processing unit (CPU) of a computer system to implement a method of sharing one or more valid tokens across multiple instances of an application in a dynamically scalable environment The method includes if a computer system issues a corresponding new refresh token for each request for a refresh of each access token, the computer system (i) receives a token request from a client interacting with instances of an application, where the token request includes a field indicating a number of tokens required for the instances of the application, (ii) in response to the token request being received, generates and shares access and refresh token pairs so that a total number of the access and refresh token pairs equals the number of tokens included in the token request, and (iii) sends the access and refresh token pairs to the client so that in response to token requests from the instances of the application, the instances of the application obtain respective access and refresh token pairs. The computer system includes an authorization server. The client is another computer system. The number of tokens is an integer greater than one. Furthermore, if the computer system does not issue the corresponding new refresh token for each request for the refresh of each access token, the computer (iv) receives from the client a request for a refresh token, (v) in response to the request for the refresh token being received, validates an existing access token which is bound to the refresh token, and (vi) in response to the existing access token being validated, if the existing access token is expired, generates and sends to the client a new access token, or if the existing access token is not expired, sends to the client the existing access token.

In another embodiment, the present invention provides a computer system including a central processing unit (CPU); a memory coupled to the CPU; and a computer-readable storage device coupled to the CPU. The storage device includes instructions that are executed by the CPU via the memory to implement a method of sharing one or more valid tokens across multiple instances of an application in a dynamically scalable environment The method includes if a computer system issues a corresponding new refresh token for each request for a refresh of each access token, the computer system (i) receives a token request from a client interacting with instances of an application, where the token request includes a field indicating a number of tokens required for the instances of the application, (ii) in response to the token request being received, generates and shares access and refresh token pairs so that a total number of the access and refresh token pairs equals the number of tokens included in the token request, and (iii) sends the access and refresh token pairs to the client so that in response to token requests from the instances of the application, the instances of the application obtain respective access and refresh token pairs. The computer system includes an authorization server. The client is another computer system. The number of tokens is an integer greater than one. Furthermore, if the computer system does not issue the corresponding new refresh token for each request for the refresh of each access token, the computer (iv) receives from the client a request for a refresh token, (v) in response to the request for the refresh token being received, validates an existing access token which is bound to the refresh token, and (vi) in response to the existing access token being validated, if the existing access token is expired, generates and sends to the client a new access token, or if the existing access token is not expired, sends to the client the existing access token.

Embodiments of the present invention provides sharing of valid token(s) among multiple application instances in a dynamically scalable environment, which decreases a chance of application failure, supports scalable environments, increases throughput and decreases turnaround time, avoids heavy loads on an OAuth server and unnecessary computing, and prevents wasting computing resources (e.g., CPU, memory, etc.).

DETAILED DESCRIPTION

Overview

Figure 1:
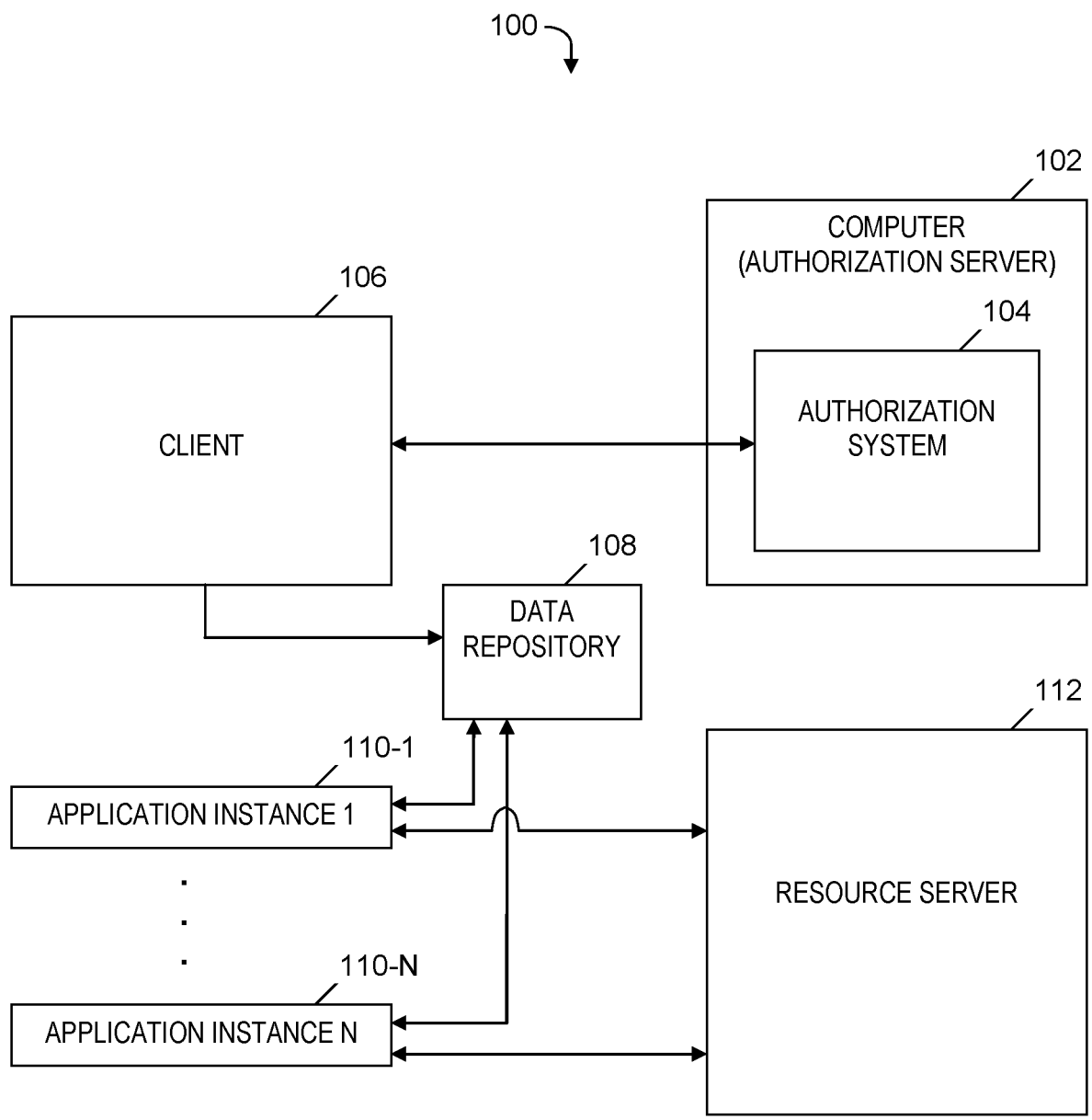
FIG. 1 is a block diagram of a system for sharing valid token(s) across multiple application instances in a dynamically scalable environment, in accordance with embodiments of the present invention.

Embodiments of the present invention provide a service that extends an OAuth framework, where the service supports a scalable application environment. The extended OAuth framework disclosed herein maintains and shares the valid token(s) across multiple instances of an application in a dynamically scalable environment, so that each instance of an application is able to communicate with an authorization server to obtain a valid access token. In one embodiment, an expired access token in an extended OAuth 2.0 framework is renewed without affecting the validity of access tokens held by other application instances in a dynamically scalable environment. In one embodiment, a service provides one or more access tokens mapped to a single refresh token or a shared refresh token, so that each instance of an application has its own copy of an access token together with the single refresh token or the shared refresh token.

The extended OAuth framework disclosed herein decreases or avoids chances of application failure, supports scalable environments, increases throughput and decreases turnaround time, avoids a heavy load on an OAuth server, avoids unnecessary computing, and prevents the wasting of computing resources (e.g., CPU, memory, etc.).

In one embodiment, the extension of the OAuth framework disclosed herein optimizes the performance of the authorization framework in a cloud environment.

The known OAuth open standard for authorization allows many tokens to be obtained for the same client, but OAuth steps need to be repeated as many times as the number of tokens required. The repeating of the OAuth steps to obtain a token N number of times presents a unique challenge because this repetition and a lack of transparency to the user is not suitable for dynamically scalable environments.

In a known OAuth environment in which multiple instances of an application are deployed and each instance requests a new access token using a refresh token, each such instance obtains a new access token. In this case, the authorization server generates the new access tokens with the same scope, even though it holds a valid access token of the same scope. Generating a new access token for each request utilizes server resources because the server persists the tokens as the tokens are validated. This utilization of server resources is a costly operation in terms of storing, searching, and maintaining the tokens. In a distributed environment, the authorization server needs to keep a replica of tokens, which is difficult to maintain. In a case of inadequate coding or an environment issue, an application restart is likely to happen frequently. In response to the restart, the instance of the application must request a new token because there is no mechanism to timestamp the token specific to an application instance.

In a known OAuth environment that includes a multi-threaded application, multiple threads handle incoming requests. Each thread can handle one request at a time and the thread is terminated in response to the request being served. The system works smoothly until the time at which the initial token expires. After the expiration of the initial token, each thread spawned to serve the incoming request must request for the refresh token when there is no synchronized mechanism to handle the refresh token. In this case, the authorization server has many unused tokens.

The known OAuth standard indicates that the refresh token is optional; therefore, if the token is compromised, there is a high security risk, which is not preferable. Further, the authorization server is open to denial-of-service (DoS) attacks. An attacker may request additional tokens to inject the tokes into an authorization server database. The attacker can create chaotic situations, such as causing application failure if there is a limit in a number of tokens that can be issued per refresh token. It is also difficult for the authorization server to discover DoS attacks.

The aforementioned disadvantages are overcome by embodiments of the present invention.

System for Sharing Valid Token(s) Across Multiple Application Instances in a Scalable Environment FIG. 1 is a block diagram of a system 100 for sharing valid token(s) across multiple application instances in a dynamically scalable environment, in accordance with embodiments of the present invention. System 100 includes a computer 102 (also known as an authorization server), which executes a software-based authorization system 104. Computer 102 is operably coupled to a client 106 (i.e., a client computer) via one or more computer networks (not shown). Client 106 stores access tokens and refresh tokens in a data repository 108.

Application instance 110-1, . . . , application instance 110-N are N application instances that request valid access tokens from authorization server 102 via client 106, where N is an integer greater than one. The access tokens allow application instances 110-1, ..., 110-N to access computing resources provided by a resource server 112. Authorization system 104 supports an OAuth 2.0 framework along with an extension to the framework that ensures that valid token(s) are shared across all of application instances 110-1, ..., 110-N in a dynamically scalable environment to lessen the likelihood of: (i) application failure, (ii) computing resource wastage, and (iii) a decrease in throughput.

In one embodiment, authorization server 102 employs refresh token rotation by which authorization server 102 issues a new refresh token for every token refresh request from client 106. In the embodiment described in this paragraph, client 106 generates a request for a token that includes assigning a value to a number_of_tokens field included in the body of the request. The value in the number_of_tokens field indicates a requested number of access and refresh token pairs. Client 106 sends the request for the token to authorization system 104, which in response, generates a response that includes access token and refresh token pairs whose total number equals the requested number of pairs indicated by the number_of_tokens field. The response that includes the aforementioned token are refresh token pairs allows each of application instances 110-1, ..., 110-N to obtain its own pair of access and refresh tokens.

In an alternate embodiment, authorization server 102 does not employ refresh token rotation, so that a refresh token never expires and an access token has limited validity, and where authorization server 102 issues a new access token for every token refresh request (i.e., employs access token rotation). In the alternate embodiment described in this paragraph, authorization system 104 checks the validity of an existing access token in response to any of application instances 110-1, ..., 110-N making a refresh token request. If authorization system 104 determines that the existing access token is valid, then authorization system 104 sends the existing access token to client 106; otherwise, authorization system 104 generates and shares a new access token with application instances 110-1, ..., 110-N by invalidating previous access token(s).

Figure 2A:
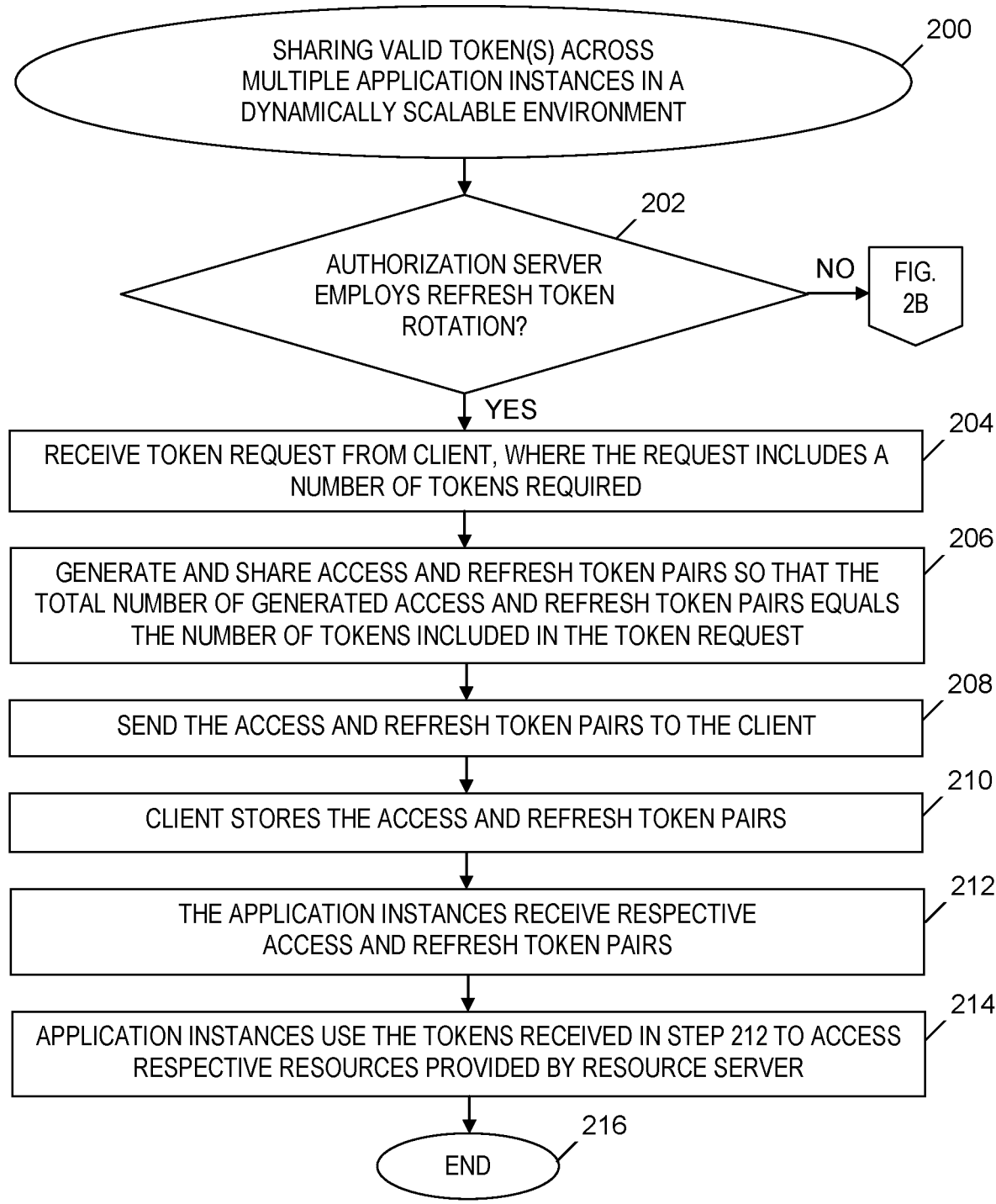
FIGS. 2A-2B depict a flowchart of a process of sharing valid token(s) across multiple application instances in a dynamically scalable environment, where the process is implemented in the system of FIG. 1, in accordance with embodiments of the present invention.
Figure 2B:
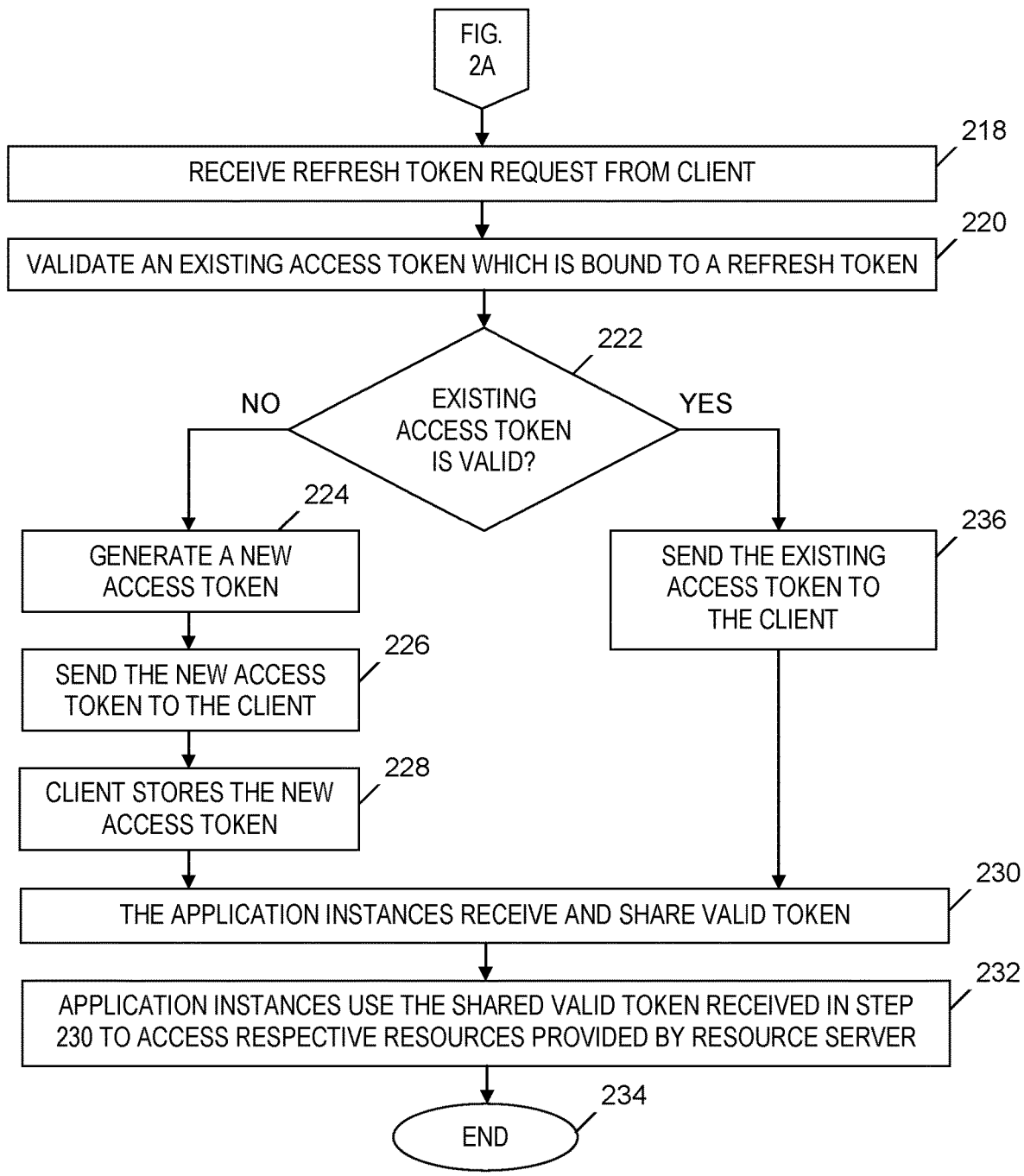
Figure 3:
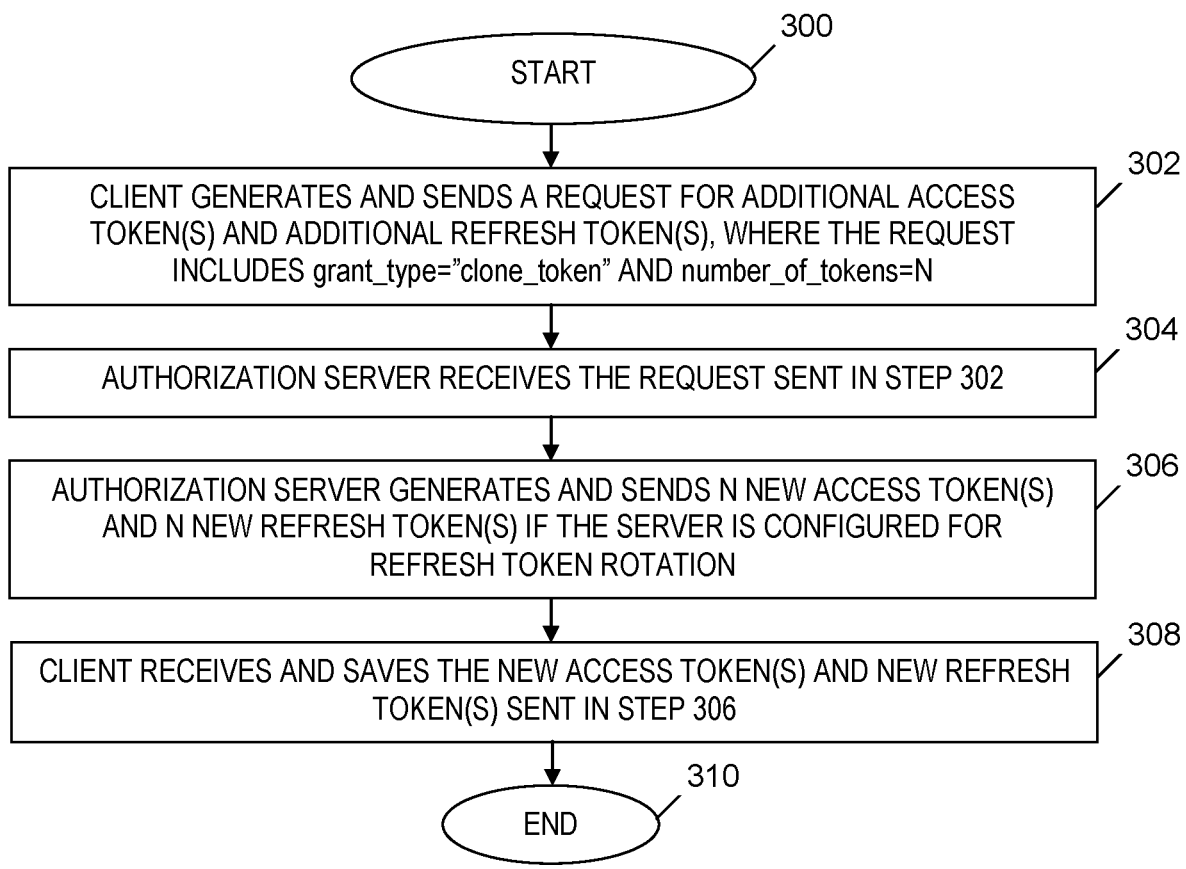
FIG. 3 is a flowchart of a process of obtaining additional access token(s) and additional refresh token(s), where the process is implemented in the system of FIG. 1, in accordance with embodiments of the present invention.

The functionality of the components shown in FIG. 1 is described in more detail in the discussion of FIGS. 2A-2B and FIG. 3 presented below.

Process for Sharing Valid Token(s) Across Multiple Application Instances in a Scalable Environment FIGS. 2A-2B depict a flowchart of a process of sharing valid token(s) across multiple application instances in a dynamically scalable environment, where the process is implemented in the system of FIG. 1, in accordance with embodiments of the present invention. The process of FIG. 2 starts at step 200. In step 202, authorization system 104 (see FIG. 1) determines whether authorization server 102 (see FIG. 1) employs refresh token rotation, where authorization server 102 (see FIG. 1) issues a new refresh token for every token refresh request. By employing refresh token rotation, authorization server 102 (see FIG. 1) invalidates a previous refresh token for each issuance of a new refresh token. The process of the steps in FIG. 2A provides a solution to the problem of maintaining a single pair of tokens (i.e., an access token and a refresh token bound to each other) across multiple application instances 110-1, ..., 110-N (see FIG. 1), where a refresh token is issued with every access token refresh request. The solution includes authorization server 102 (see FIG. 1) sharing multiple pairs of access and refresh tokens, as described below.

Authorization Server Employs Refresh Token Rotation:

If authorization system 104 (see FIG. 1) determines in step 202 that authorization server 102 (see FIG. 1) employs refresh token rotation, then the Yes branch of step 202 is followed and an extended OAuth dance is performed that includes (1) a token flow by which access and refresh tokens are obtained, (2) a refresh token flow by which the access token is refreshed after the access token expires, (3) a flow for obtaining additional token(s) (i.e., token cloning flow), and (4) a flow for revoking a token (i.e., revocation flow).

Token Flow:

The aforementioned token flow by which access and refresh tokens are obtained starts with step 204. In step 204, authorization system 104 (see FIG. 1) receives a token request from client 106 (see FIG. 1), where the request includes a field (e.g., number_of_tokens) having a value that indicates a number of tokens required for application instances 110-1, ..., 110-N (see FIG. 1). In one embodiment, the number of tokens required is equal to the number of application instances included in application instances 110-1, ..., 110-N (see FIG. 1).

In step 206, authorization system 104 (see FIG. 1) generates access token and refresh token pairs, so that the total number of generated access and refresh token pairs equals the number of tokens included in the request received in step 204, and so that the generated access and refresh token pairs are shared with respective application instances 110-1, ..., 110-N (see FIG. 1). In one embodiment, in response to generating a new refresh token in step 206, authorization system 104 invalidates a previously generated refresh token.

In step 208, authorization system 104 (see FIG. 1) sends the access and refresh token pairs generated in step 206 to client 106.

In step 210, in response to the access and refresh token pairs being sent in step 208, client 106 (see FIG. 1) receives and stores the access and refresh token pairs in data repository 108 (see FIG. 1).

In step 212, based on the access and refresh token pairs being sent in step 208, application instances 110-1, ..., 110-N (see FIG. 1) receive respective access and refresh token pairs from data repository 108 (see FIG. 1).

In step 214, based on the access and refresh token pairs being sent in step 208, application instances 110-1, ..., 110-N (see FIG. 1) access respective computing resources provided by resource server 112 (see FIG. 1) by using the access and refresh token pairs received in step 212.

In step 216, which follows step 214, the process of FIGS. 2A-2B ends.

In one embodiment, authorization server 102 (see FIG. 1) binds the tokens generated in step 206 to an authorization code, which is granted in an extension of an authorization code grant provided by the OAuth 2.0 authorization framework. The binding of the tokens to the authorization code may be used to facilitate invalidating the tokens in response to a request to invalidate or revoke the tokens.

In one embodiment, the field indicating the number of tokens required is optional. If the token request received in step 204 does not have the field indicating the number of tokens, then authorization server 102 (see FIG. 1) sends one pair of access and refresh tokens in step 208.

Refresh Token Flow:

The aforementioned refresh token flow includes client 106 (see FIG. 1) obtaining a refreshed access token by following the procedure as defined in "The OAuth 2.0 Authorization Framework," Internet Engineering Task Force (IETF), Request for Comments (RFC) 6749, October 2012 (hereinafter, "The OAuth 2.0 Authorization Framework"). Authorization server 102 (see FIG. 1) generates a new access token and refresh token for every access token refresh request, and invalidating the previously generated access token and refresh token.

Token Cloning Flow:

The aforementioned flow for obtaining additional token(s) is described below in the discussion relative to FIG. 3.

Revocation Flow:

The aforementioned flow for revoking a token is described below in the discussion relative to FIG. 4.

Authorization Server does not Employ Refresh Token Rotation:

Returning to step 202, if authorization system 104 (see FIG. 1) determines that authorization server 102 (see FIG. 1) does not employ refresh token rotation (i.e., determines that authorization server 102 (see FIG. 1) employs access token rotation), then the No branch of step 202 is followed, and a token flow and a refresh token flow are performed as part of an extended OAuth 2.0 dance. The token flow includes client 106 (see FIG. 1) obtaining access and refresh tokens by following the procedure as defined in "The OAuth 2.0 Authorization Framework," and passing the tokens to application instances 110-1, ..., 110-N (see FIG. 1) for further usage by the application. The refresh token flow refreshes a token that has expired by following the process starting at step 218 in FIG. 2B.

In step 218, authorization system 104 (see FIG. 1) receives a refresh token request form client 106 (see FIG. 1).

In step 220, authorization system 104 (see FIG. 1) validates an existing access token which is bound to a refresh token.

In step 222, authorization system 104 (see FIG. 1) determines whether the existing access token is valid (i.e., determines whether the existing access token is not expired). If authorization system 104 (see FIG. 1) determines in step 222 that the existing access token is not valid (i.e., the existing access token is expired), then the No branch of step 222 is followed and step 224 is performed.

In step 224, authorization system 104 (see FIG. 1) generates a new access token. In step 226, authorization system 104 (see FIG. 1) sends the new access token to client 106 (see FIG. 1). In step 228, in response to the new access token being sent tin step 226, client 106 (see FIG. 1) receives and stores the new access token in data repository 108 (see FIG. 1).

In step 230 which follows step 228, based on the new access token being sent in step 226, application instances 110-1, ..., 110-N (see FIG. 1) receive and share a valid token from data repository 108, where the valid token is the new access token that was sent in step 226.

In step 232, application instances 110-1, ..., 110-N (see FIG. 1) access respective computing resources provided by resource server 112 (see FIG. 1) by using the shared valid token that was received in step 230.

Following step 232, the process of FIGS. 2A-2B ends at step 234.

Returning to step 222, authorization system 104 (see FIG. 1) determines that the existing access token is valid (i.e., determines that the existing access token is not expired), then the Yes branch of step 222 is followed and step 236 is performed.

In step 236, authorization system 104 (see FIG. 1) sends the existing access token to client 106 (see FIG. 1).

In step 230 which follows step 236, based on the existing access token being sent in step 236, application instances 110-1, ..., 110-N (see FIG. 1) receive and share a valid token from data repository 108, where the valid token is the existing access token that was sent in step 236. In step 232 which follows step 236 and step 230, application instances 110-1, ..., 110-N (see FIG. 1) access respective computing resources provided by resource server 112 (see FIG. 1) by using the valid token that was received in step 230. Again, following step 232, the process of FIGS. 2A-2B ends at step 234.

In one embodiment, authorization server 102 (see FIG. 1) does not employ refresh token rotation and the process of FIGS. 2A-2B allows (1) multiple instances of an application (i.e., application instances 110-1, ..., 110-N in FIG. 1) to use the shared access and refresh tokens obtained by performing an OAuth dance provided by the steps in FIGS. 2A-2B, (2) each application instance to have a shared copy of the tokens, and (3) authorization server 102 (see FIG. 1) to safely refresh the access token using the steps in FIG. 2B.

In one embodiment, authorization server 102 (see FIG. 1) employs refresh token rotation, and the process of FIGS. 2A-2B allows (1) multiple instances of an application (i.e., application instances 110-1, ..., 110-N in FIG. 1) to use the access and refresh token pairs obtained in step 212, (2) each application instance to have its own access and refresh token, where the application includes logic that manages the distribution of the tokens among the application instances, and (3) authorization server 102 (see FIG. 1) to safely refresh the access token using the steps in FIG. 2A.

In alternate embodiments, the process of FIGS. 2A-2B is divided into separate first and second processes, or includes only the first process or only the second process. In the aforementioned first process, authorization server 102 (see FIG. 1) supports refresh token rotation and includes steps 204, 206, 208, 210, 212, 214, and 216 in FIG. 2A, but does not include step 202 in FIG. 2A or the steps in FIG. 2B. In the aforementioned second process, authorization server 102 (see FIG. 1) does not support refresh token rotation and includes steps 218, 220, 222, 224, 226, 228, 230, 232, 234, and 236 in FIG. 2B, but does not include the steps in FIG. 2A.

As one example in which authorization server 102 (see FIG. 1) returns the existing access token if the existing access token is valid, client 106 (see FIG. 1) performs a Hypertext Transfer Protocol (HTTP) "POST" method (i.e., POST/token) to send the following refresh token request which is received in step 218:

&grant_type="refresh_token"
&client_id={client_id}&client_secret={client_secret}
&refresh_token={refresh_token}

Continuing the aforementioned example, in step 226 (if the existing access token is expired) or step 236 (if the existing access token is not expired), authorization server 102 sends the following/token response:

```
{
    "access_token": "2YotnFZFEjr1"
    "token_type": "example"
    "expires_in": 3600
}
```

Token Cloning

FIG. 3 is a flowchart of a process of obtaining additional access token(s) and additional refresh token(s), where the process is implemented in system 100 of FIG. 1, in accordance with embodiments of the present invention. In the case in which authorization server 102 (see FIG. 1) employs refresh token rotation, and before performing the aforementioned token flow and refresh token flow, it may not be known how many tokens are required in a dynamically scalable environment. To accommodate a dynamically growing need for tokens in the case in which authorization server 102 (see FIG. 1) is configured for refresh token rotation, the token cloning flow described by the steps in FIG. 3 is used to obtain additional token(s) having the same permissions.

The process of FIG. 3 starts at step 300. In step 302, client 106 (see FIG. 1) generates and sends a request for additional access token(s) and additional refresh token(s) to the token endpoint by adding the following new values for the following parameters in the token call in the HTTP request entity-body as specified in "The OAuth 2. Authorization Framework":

Grant_Type:

a required parameter whose value must be set to "clone_token" (or another new indicator of token cloning), which is a new value of grant_type.

Number_Of_Tokens:

an optional parameter whose value indicates the number of tokens requested in the request received in step 204 (see FIG. 2A). The value of number_of_tokens is an integer greater than one. If the number_of_tokens parameter is not included in the request for additional token(s), then authorization server 102 (see FIG. 1) returns one set of tokens (i.e., an access token and a refresh token).

In one embodiment, the requested additional tokens include n new access tokens and n new refresh tokens, where n is the value of number_of_tokens.

In step 304, authorization server 102 (see FIG. 1) receives the above-described request for additional access token(s) and additional refresh token(s), where the request was sent by client 106 (see FIG. 1) in step 302.

In step 306, authorization server 102 (see FIG. 1) generates a response to the request received in step 304, where the response includes new access token(s) and new refresh token(s). Also in step 306, authorization server 102 (see FIG. 1) sends to client 106 (see FIG. 1) the response to the request received in step 304. In the response, the total number of new access token(s) and the total number of new refresh token(s) are each equal to the value of number_of_tokens included in the request sent in step 302. Authorization server 102 (see FIG. 1) performs step 306 only if authorization server 102 (see FIG. 1) is configured for refresh token rotation.

In step 308, client 106 (see FIG. 1) receives the response sent in step 306 and saves the new access token(s) and the new refresh token(s) that are included in the response sent in step 306.

The process of FIG. 3 ends at step 310.

As one example, the request received in step 304 includes:
POST/token HTTP/1.1
Host: server.example.com
Authorization: Basic czZCaGRSa3F0MzpnWDFmQmF0M2JW
Content-Type: application/x-www-form-urlencoded
grant_type=clone_token&refresh_token=
tGZv3JOkF0XG5Qx2T1KWIA
&number_of_tokens=2

As one example, the response generated in step 306 is the following response:

```
{
    "tokens": [{
        "access_token":"2YotnFZFEjr1zCsicMWpAA",
        "token_type":"example",
        "expires_in":3600,
```

```
        "refresh_token":"tGzv3JOkF0XG5Qx2TlKWIA",
        "example_parameter":"example_value"
    },
    {
        "access_token": "222YotnFZFEjr1zCsicMWpAA",
        "token_type": "example",
        "expires_in": 3600,
        "refresh_token": "23tGzv3JOkF0XG5Qx2TlKWIA"
    }]
}
```

Token Revocation

Figure 4:
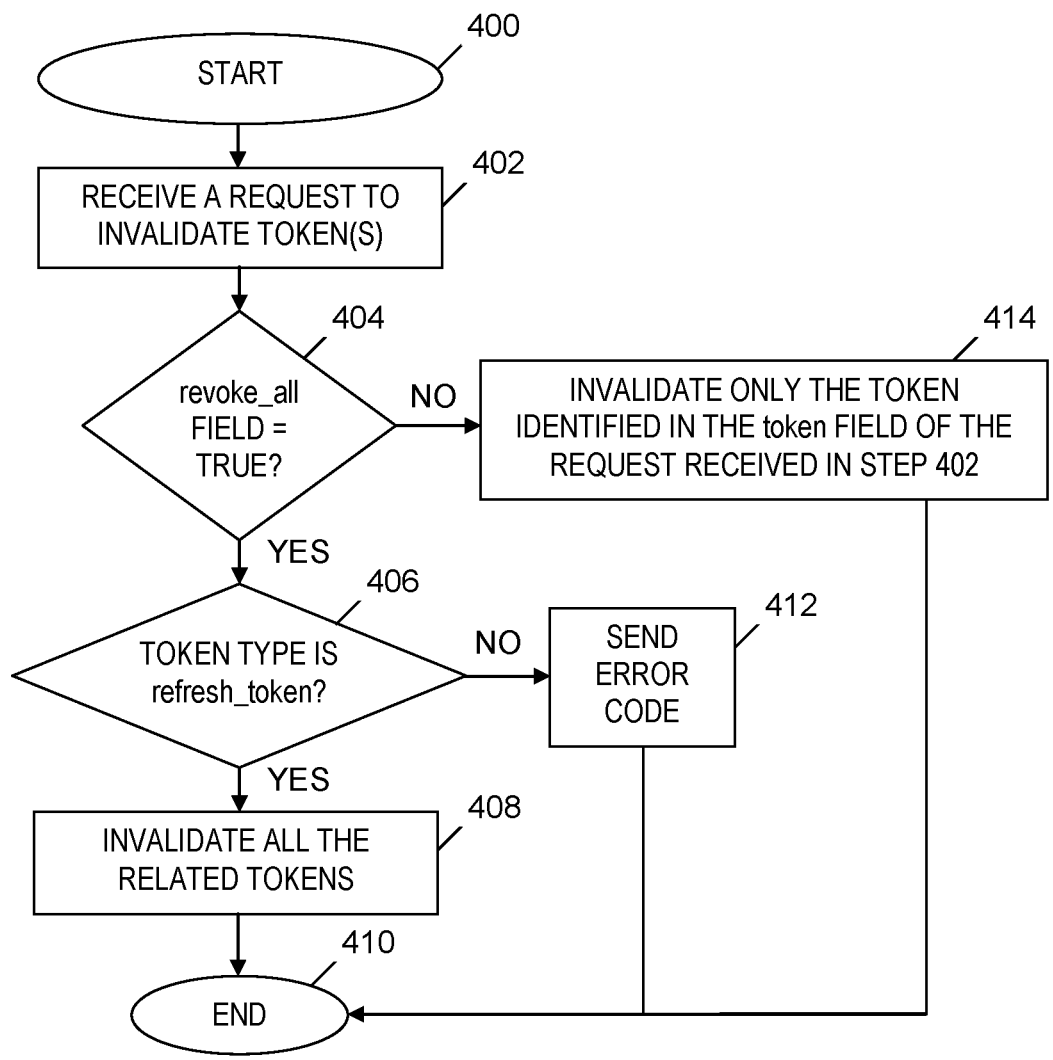
FIG. 4 is a flowchart of a process of revoking token(s), where the process is implemented in the system of FIG. 1, in accordance with embodiments of the present invention.

FIG. 4 is a flowchart of a process of revoking token(s), where the process is implemented in system 100 of FIG. 1, in accordance with embodiments of the present invention. In one embodiment, client 106 (see FIG. 1) needs to revokes token(s) that were obtained by the token cloning flow described above relative to FIG. 3. The process of FIG. 4 starts at step 400. Prior to step 402, client 106 (see FIG. 1) generates a request to revoke token(s) (i.e., request to invalidate token(s)), where the request includes the following parameters (i.e., fields) using a format of "application/x-www-form-urlencoded" in the HTTP request entity-body:

Token:

a required parameter whose value identifies the token that client 106 (see FIG. 1) is requesting to be revoked. Hereinafter, the parameter called "token" is also referred to as "the token parameter."

Revoke_all:

a new and optional parameter whose value is true to indicate that all tokens cloned by the process of FIG. 3 are to be revoked. The value of revoke_all is valid only if the token identified by the value of the token parameter is "refresh_token". If the value of revoke_all is false or if revoke_all is not included in the request from client 106 (see FIG. 1), then authorization server 102 (see FIG. 1) revokes only the token (i.e., either a refresh token or an access token) identified by the value of the token parameter, which is the default behavior.

Token_Type_Hint:

an optional parameter whose value indicates a hint about the type of token whose revocation is being requested. For example, client 106 (see FIG. 1) may request the revocation of a refresh token with the following request:
POST/revoke HTTP/1.1
Host: server.example.com
Content-Type: application/x-www-form-urlencoded
Authorization: Basic czZCaGRSa3F0MzpnWDFmQmF0M2JW
token=45ghiukldjandnhzdauz &
token_type_hint=refresh_token&revoke_all=true In step 402, authorization server 102 (see FIG. 1) receives the aforementioned request to invalidate token(s).

In step 404, authorization server 102 (see FIG. 1) determines whether the value of the revoke_all parameter is true. If authorization server 102 (see FIG. 1) determines in step 404 that the value of the revoke_all parameter is true, then the Yes branch of step 404 is followed and step 406 is performed.

In step 406, authorization server 102 (see FIG. 1) determines whether the value of token_type_hint is refresh_token (i.e., whether the type of the token identified by the token parameter is a refresh token). If authorization server 102 (see FIG. 1) determines in step 406 that the value of token_type_hint is refresh_token, then the Yes branch of step 406 is followed and step 408 is performed.

In step 408, authorization server 102 (see FIG. 1) invalidates all the related tokens (i.e., the tokens that were cloned by the process of FIG. 3).

In step 410, the process of FIG. 4 ends.

Returning to step 406, if authorization server 102 (see FIG. 1) determines that the value of token_type_hint is not refresh_token, then the No branch of step 406 is followed and step 412 is performed. In step 412, authorization server 102 (see FIG. 1) sends to client 106 (see FIG. 1) an error code indicating that authorization server 102 (see FIG. 1) cannot revoke the token identified in the request received in step 402. Following step 412, the process of FIG. 4 ends at step 410.

Returning to step 404, if authorization server 102 (see FIG. 1) determines that the value of revoke_all is false (or if the revoke_all parameter is not included in the request received in step 402), then the No branch of step 404 is followed and step 414 is performed. In step 414, authorization server 102 (see FIG. 1) invalidates only the token identified by the value of the token parameter included in the request received in step 402. Following step 414, the process of FIG. 4 ends at step 410.

Examples

Figure 5:
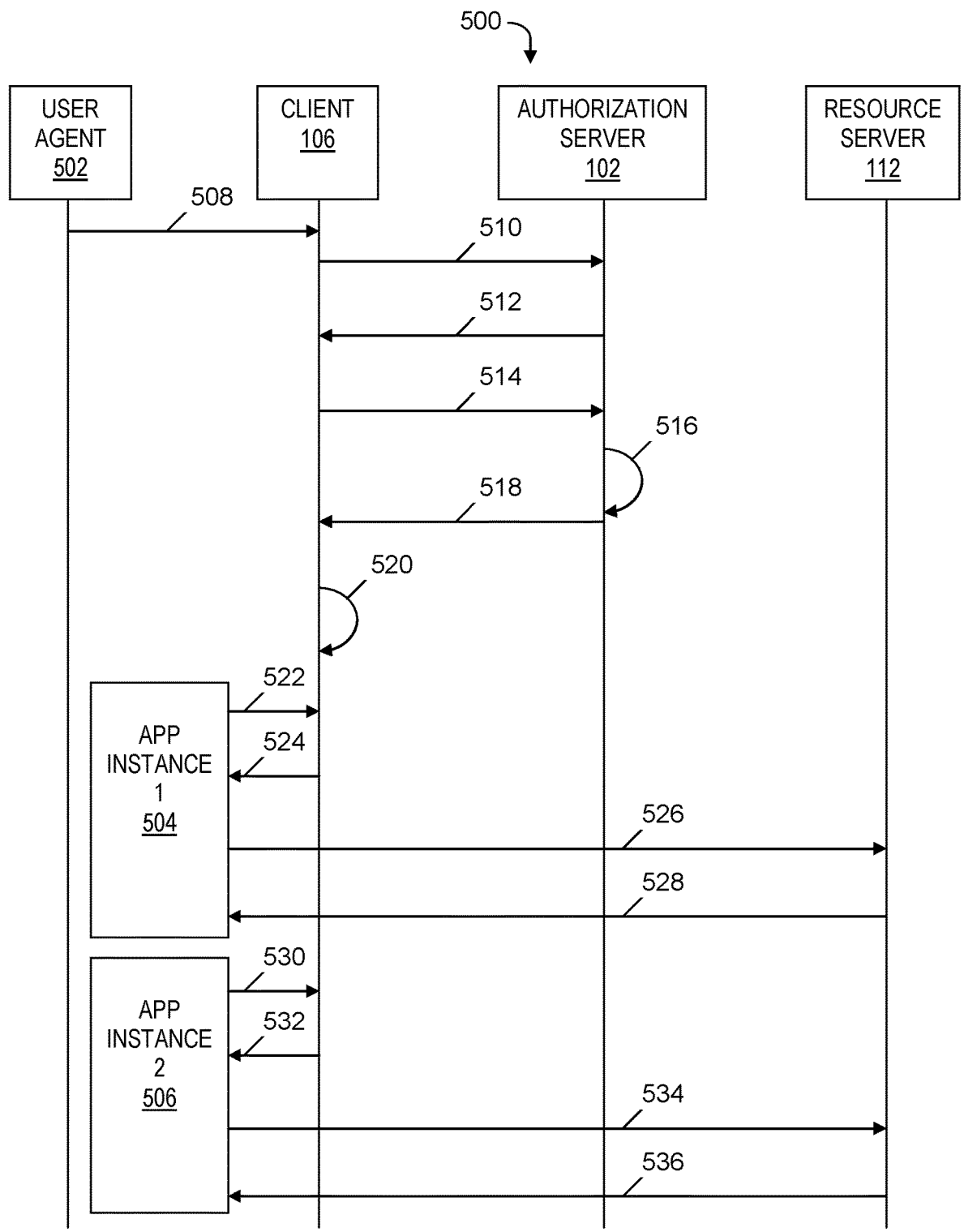
FIG. 5 is a sequence diagram illustrating a first example of obtaining access token(s) and refresh token(s) in a case in which an authorization server employs refresh token rotation.

FIG. 5 is a sequence diagram illustrating an example 500 of obtaining access token(s) and refresh token(s) in a case in which an authorization server employs refresh token rotation. Example 500 includes steps performed by a user agent 502, client 106, authorization server 102, resource server 112, app instance 504, and app instance 506 to obtain access tokens and refresh tokens in a case in which authorization server 102 employs refresh token rotation and an authorization code grant is made.

In step 508, user agent 502 initiates an authorization process in an OAuth 2.0 framework.

In step 510, authorization server 102 receives a GET/Authorize request sent from client 106, which is a request to obtain an authorization code.

In step 512, authorization server 102 sends to client 106 a/Authorize response to the request received in step 510, where the response includes an authorization code.

In step 514, authorization server 102 receives a POST/token request sent from client 106, which requests two access token and refresh token pairs. The request includes grant_type=authorization_code, the authorization code that was included in the response sent in step 512, and number_of_tokens=2.

For example, the request received in step 514 may be the following HTTP request:
POST/token HTTP/1.1
Host: server.example.com
Authorization: Basic czZCaGRSa3F0MzpnWDFmQmF0M2JW
Content-Type: application/x-www-form-urlencoded
grant_type=authorization_code&code=SplxlOBeZQ-QYbYS6WxSbIA
&redirect_uri=https%3A%2F%2Fclient%2Eexample%2Ecom%2Fcb
&number_of_tokens=2

In step 516, authorization server 102 generates the requested two access and refresh token pairs as a first pair of access and refresh tokens and a second pair of access and refresh tokens.

In step 518, authorization server 102 sends to client 106 a response to the request received in step 514, where the response includes the first and second pairs of access and refresh tokens.

For example, the response sent in step 518 may be the following response:

```
{
    "tokens": [{
        "access_token":"2YotnFZFEjr1zCsicMWpAA",
        "token_type":"example",
        "expires_in":3600,
        "refresh_token":"tGzv3JOkF0XG5Qx2TlKWIA",
        "example_parameter":"example_value"
    },
    {
        "access_token":"222YotnFZFEjr1zCsicMWpAA",
        "token_type":"example",
        "expires_in":3600,
        "refresh_token":"23tGzv3JOkF0XG5Qx2TlKWIA",
        "example_parameter":"example_value"
    }]
}
```

In step 520, client 106 receives and saves the pairs of tokens sent in step 518. Client 106 saves the aforementioned pairs of tokens in data repository 108 (see FIG. 1).

In step 522, app instance 504 sends to client 106 a request to obtain an access or refresh token stored in data repository 108 (see FIG. 1) (i.e., hereinafter also referred to as token 1 in the discussion of FIG. 5). App instance 504 is one of the application instances included in application instances 110-1, . . . , 110-N (see FIG. 1).

In step 524, client 106 retrieves from data repository 108 (see FIG. 1) token 1 (i.e., the token requested in step 522), and sends token 1 to app instance 504.

In step 526, app instance 504 sends a GET/resource/1 request to resource server 112 to obtain access to a first resource provided by resource server 112, where the request indicates token 1.

In step 528, resource server 112 sends to app instance 504 a response to the request sent in step 526, where the response authorizes app instance 504 to access the aforementioned first resource provided by resource server 112.

In step 530, app instance 506 sends to client 106 a request to obtain an access or refresh token stored in data repository 108 (see FIG. 1) (hereinafter also referred to as token 2 in the discussion of FIG. 5). App instance 506 is another one of the application instances included in application instances 110-1, . . . , 110-N (see FIG. 1), but is different from app instance 504.

In step 532, client 106 retrieves from data repository 108 (see FIG. 1) token 2 (i.e., the token requested in step 530), and sends token 2 to app instance 506.

In step 534, app instance 506 sends a GET/resource/1 request to resource server 112 to obtain access to a second resource provided by resource server 112, where the request indicates token 2.

In step 536, resource server 112 sends to app instance 506 a response to the request sent in step 534, where the response authorizes app instance 506 to access the aforementioned second resource provided by resource server 112.

Figure 6:
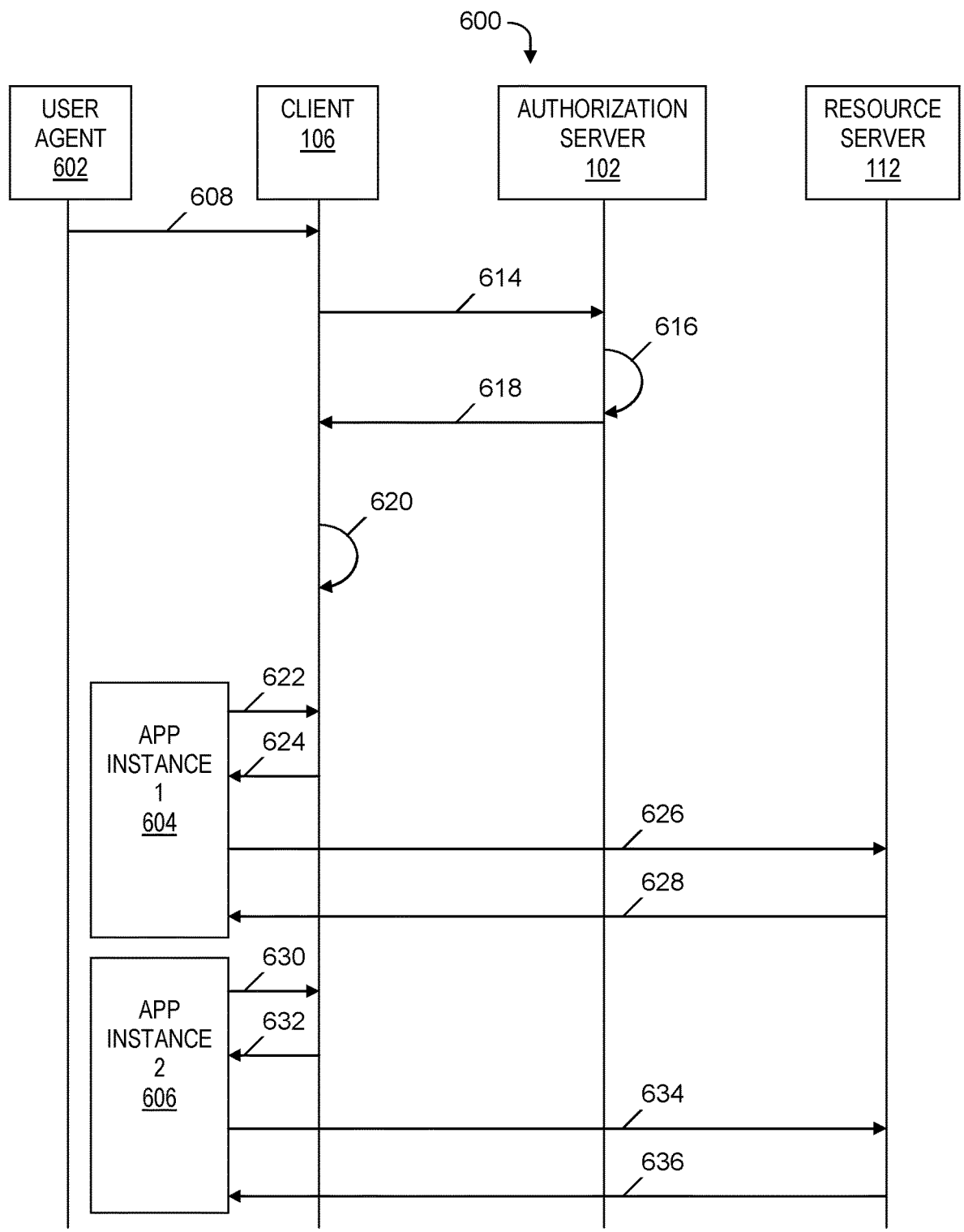
FIG. 6 is a sequence diagram illustrating a second example of obtaining access token(s) and refresh token(s) in a case in which an authorization server employs refresh token rotation.

FIG. 6 is a sequence diagram illustrating an example 600 of obtaining access token(s) and refresh token(s) in a case in which an authorization server employs refresh token rotation. Example 600 includes steps performed by a user agent 602, client 106, authorization server 102, resource server 112, a first app instance 604, and a second app instance 606 to obtain access tokens and refresh tokens in a case in which authorization server 102 employs refresh token rotation and resource owner password credentials grant is made.

In step 608, user agent 602 initiates an authorization process in an OAuth 2.0 framework.

In step 614, authorization server 102 receives a POST/token request sent from client 106, which requests two access token and refresh token pairs. The request includes grant_type=password, the user name and password, and number_of_tokens=2.

For example, the request received in step 614 may be the following HTTP request:
POST/token HTTP/1.1
Host: server.example.com
Authorization: Basic czZCaGRSa3F0MzpnWDFmQmF0M2JW
Content-Type: application/x-www-form-urlencoded
grant_type=password&username=johndoe&password=A3ddj3w
&number_of_tokens=2

In step 616, authorization server 102 generates the requested two access and refresh token pairs as a first pair of access and refresh tokens and a second pair of access and refresh tokens.

In step 618, authorization server 102 sends to client 106 a response to the request received in step 614, where the response includes the first and second pairs of access and refresh tokens.

For example, the response sent in step 618 may be the following response:

```
{
    "tokens": [{
        "access_token":"2YotnFZFEjr1zCsicMWpAA",
        "token_type":"example",
        "expires_in":3600,
        "refresh_token":"tGzv3JOkF0XG5Qx2TlKWIA",
        "example_parameter":"example_value"
    },
    {
        "access_token":"222YotnFZFEjr1zCsicMWpAA",
        "token_type":"example",
        "expires_in":3600,
        "refresh_token":"23tGzv3JOkF0XG5Qx2TlKWIA",
        "example_parameter":"example_value"
    }]
}
```

In step 620, client 106 receives and saves the pairs of tokens sent in step 618. Client 106 saves the aforementioned pairs of tokens in data repository 108 (see FIG. 1).

In step 622, first app instance 604 sends to client 106 a request to obtain an access or refresh token stored in data repository 108 (see FIG. 1) (i.e., hereinafter also referred to as token 1 in the discussion of FIG. 6). First app instance 604 is one of the application instances included in application instances 110-1, . . . , 110-N (see FIG. 1).

In step 624, client 106 retrieves from data repository 108 (see FIG. 1) token 1 (i.e., the token requested in step 622), and sends token 1 to first app instance 604.

In step 626, first app instance 604 sends a GET/resource/1 request to resource server 112 to obtain access to a first resource provided by resource server 112, where the request indicates token 1.

In step 628, resource server 112 sends to first app instance 604 a response to the request sent in step 626, where the response authorizes first app instance 604 to access the aforementioned first resource provided by resource server 112.

In step 630, second app instance 606 sends to client 106 a request to obtain an access or refresh token stored in data repository 108 (see FIG. 1) (hereinafter also referred to as token 2 in the discussion of FIG. 6). Second app instance 606 is another one of the application instances included in application instances 110-1, . . . , 110-N (see FIG. 1), but is different from first app instance 604.

In step 632, client 106 retrieves from data repository 108 (see FIG. 1) token 2 (i.e., the token requested in step 630), and sends token 2 to second app instance 606.

In step 634, second app instance 606 sends a GET/resource/1 request to resource server 112 to obtain access to a second resource provided by resource server 112, where the request indicates token 2.

In step 636, resource server 112 sends to second app instance 606 a response to the request sent in step 634, where the response authorizes second app instance 606 to access the aforementioned second resource provided by resource server 112.

Computer System

Figure 7:
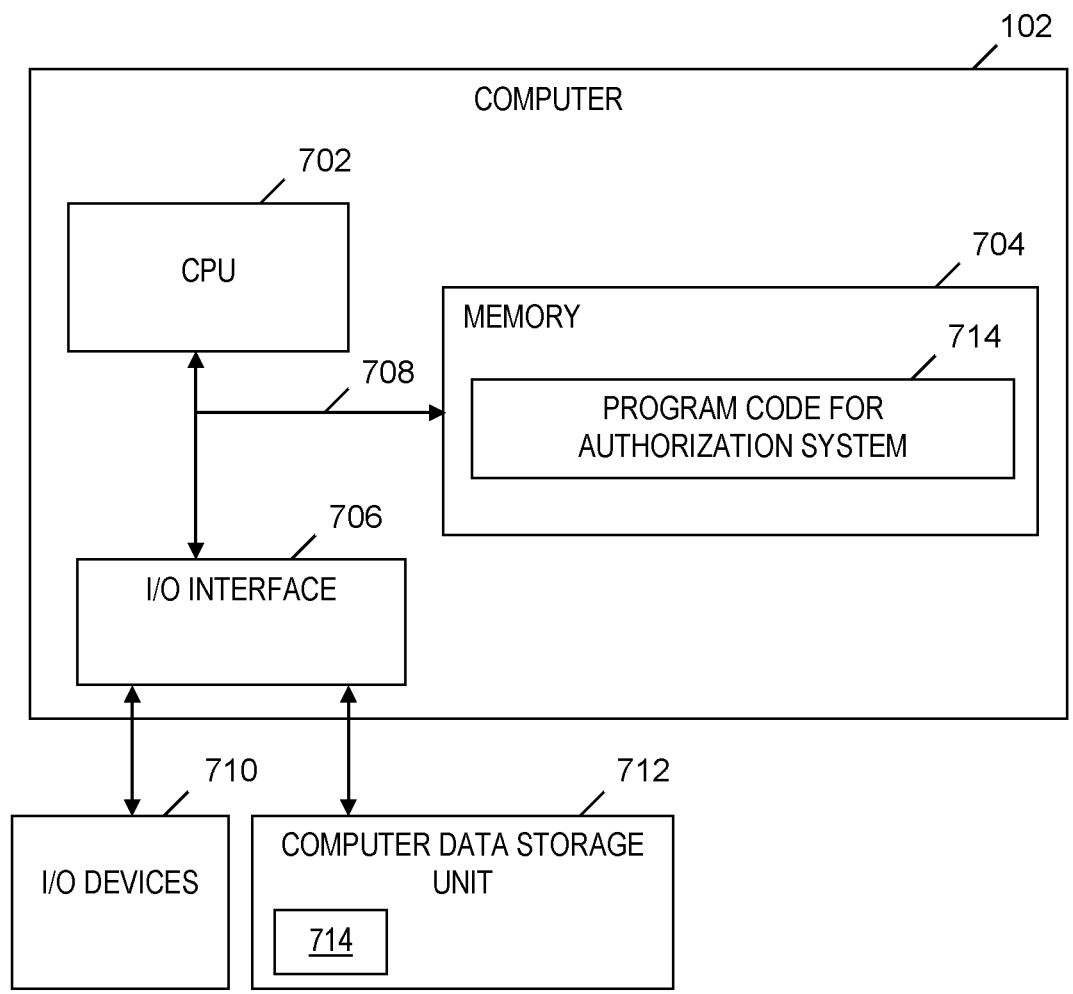
FIG. 7 is a block diagram of a computer included in the system of FIG. 1 and that implements the processes of FIGS. 2A-2B, FIG. 3, and FIG. 4, in accordance with embodiments of the present invention.

FIG. 7 is a block diagram of a computer included in the system of FIG. 1 and that implements the processes of FIGS. 2A-2B, FIG. 3, and FIG. 4, in accordance with embodiments of the present invention. Computer 102 (also known as authorization server 102) is a computer system that generally includes a central processing unit (CPU) 702, a memory 704, an input/output (I/O) interface 706, and a bus 708. Further, computer 102 is coupled to I/O devices 710 and a computer data storage unit 712. CPU 702 performs computation and control functions of computer 102, including executing instructions included in program code 714 for authorization system 104 (see FIG. 1) to perform a method of sharing valid token(s) across multiple application instances in a dynamically scalable environment, where the instructions are executed by CPU 702 via memory 704. CPU 702 may include a single processing unit, or be distributed across one or more processing units in one or more locations (e.g., on a client and server).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are executed. Moreover, similar to CPU 702, memory 704 may reside at a single physical location, including one or more types of data storage, or be distributed across a plurality of physical systems in various forms. Further, memory 704 can include data distributed across, for example, a local area network (LAN) or a wide area network (WAN).

I/O interface 706 includes any system for exchanging information to or from an external source. I/O devices 710 include any known type of external device, including a display, keyboard, etc. Bus 708 provides a communication link between each of the components in computer 102, and may include any type of transmission link, including electrical, optical, wireless, etc.

I/O interface 706 also allows computer 102 to store information (e.g., data or program instructions such as program code 714) on and retrieve the information from computer data storage unit 712 or another computer data storage unit (not shown). Computer data storage unit 712 includes a known computer readable storage medium, which is described below. In one embodiment, computer data storage unit 712 is a non-volatile data storage device, such as a magnetic disk drive (i.e., hard disk drive) or an optical disc drive (e.g., a CD-ROM drive which receives a CD-ROM disk).

Memory 704 and/or storage unit 712 may store computer program code 714 that includes instructions that are executed by CPU 702 via memory 704 to share valid token(s) across multiple application instances in a dynamically scalable environment. Although FIG. 7 depicts memory 704 as including program code, the present invention contemplates embodiments in which memory 704 does not include all of code 714 simultaneously, but instead at one time includes only a portion of code 714.

Further, memory 704 may include an operating system (not shown) and may include other systems not shown in FIG. 7.

Storage unit 712 and/or one or more other computer data storage units (not shown) that are coupled to computer 102 may include data repository 108 (see FIG. 1) which stores access and refresh tokens generated by authorization system 104 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to sharing valid token(s) across multiple application instances in a dynamically scalable environment. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 102) including one or more processors (e.g., CPU 702), wherein the processor(s) carry out instructions contained in the code causing the computer system to share valid token(s) across multiple application instances in a dynamically scalable environment. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of sharing valid token(s) across multiple application instances in a dynamically scalable environment.

While it is understood that program code 714 for sharing valid token(s) across multiple application instances in a dynamically scalable environment may be deployed by manually loading directly in client, server and proxy computers (not shown) via loading a computer readable storage medium (e.g., computer data storage unit 712), program code 714 may also be automatically or semi-automatically deployed into computer 102 by sending program code 714 to a central server or a group of central servers. Program code 714 is then downloaded into client computers (e.g., computer 102) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of sharing valid token(s) across multiple application instances in a dynamically scalable environment. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium or media (i.e., memory 704 and computer data storage unit 712) having computer readable program instructions 714 thereon for causing a processor (e.g., CPU 702) to carry out aspects of the present invention.

The computer readable storage medium can be a tangible device that can retain and store instructions (e.g., program code 714) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 102) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B, FIG. 3, AND FIG. 4) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer program product, comprising:
a computer readable storage medium; and
a computer readable program code stored in the computer readable storage medium, the computer readable program code containing instructions that are executed by a central processing unit (CPU) of a computer system to implement a method of sharing one or more valid tokens across multiple instances of an application in a dynamically scalable environment, the method comprising the steps of:
if the computer system, which includes an authorization server, issues a corresponding new refresh token for each request for a refresh of each access token, the computer system (i) receiving a token request from a client interacting with instances of an application, the client being another computer system, the token request including a field indicating a number of tokens required, and the number of tokens being an integer greater than one, (ii) in response to the step of receiving the token request, generating and sharing access and refresh token pairs so that a total number of the access and refresh token pairs equals the number of tokens required included in the token request, and (iii) sending the access and refresh token pairs to the client so that in response to token requests from the instances of the application, the instances of the application obtain respective access and refresh token pairs; or
if the computer system does not issue the corresponding new refresh token for each request for the refresh of each access token, the computer system (iv) receiving from the client a request for a refresh token, (v) in response to the step of receiving the request for the refresh token, validating an existing access token which is bound to the refresh token, and (vi) in response to the step of validating, if the existing access token is expired, generating and sending to the client a new access token, or in response to the step of validating, if the existing access token is not expired, sending to the client the existing access token;

the computer system determining the existing access token is expired;

based on the computer system not issuing the corresponding new refresh token for each request for the refresh of each access token, and based on the existing access token being expired, the computer system invalidating the existing access token; and based on the new access token being sent to the client and the existing access token being invalidated, sharing a valid access token with each of the instances of the application, the valid access token being the new access token.

2. The computer program product of claim 1, wherein the method implemented by the instructions being executed by the CPU further comprises the step of the computer system extending an Oath 2.0 authorization framework that enables the instances of the application to have access to a service, wherein the step of extending is a result of the steps of (i) receiving the token request from the client, (ii) generating and sharing the access and refresh token pairs, (iii) sending the access and refresh token pairs, (iv) receiving the request for a refresh token, (v) validating the existing access token and (vi) generating and sending the new access token if the existing access token is expired, or sending the existing access token if the existing access token is not expired.

3. The computer program product of claim 1, wherein the method implemented by the instructions being executed by the CPU further comprises the step of accessing resources of a resource server using the new access token which is shared with each of the instances of the application.

4. The computer program product of claim 1, wherein the method implemented by the instructions being executed by the CPU further comprises the step of based on the computer system issuing the corresponding new refresh token for each request for the refresh of each access token, the computer system receiving an authorization code in the token request, wherein the step of generating and sharing the access and refresh token pairs is based in part on the authorization code being received.

5. The computer program product of claim 1, wherein the method implemented by the instructions being executed by the CPU further comprises the step of based on the computer system issuing the corresponding new refresh token for each request for the refresh of each access token, the computer system receiving password credentials of a resource owner in the token request, wherein the step of generating and sharing the access and refresh token pairs is based in part on the password credentials of the resource owner being received.

6. A computer system comprising:
a central processing unit (CPU);
a memory coupled to the CPU; and
a computer readable storage device coupled to the CPU, the storage device containing instructions that are executed by the CPU via the memory to implement a method of sharing one or more valid tokens across multiple instances of an application in a dynamically scalable environment, the method comprising the steps of:
if the computer system, which includes an authorization server, issues a corresponding new refresh token for each request for a refresh of each access token, the computer system (i) receiving a token request from a client interacting with instances of an application, the client being another computer system, the token request including a field indicating a number of tokens required, and the number of tokens being an integer greater than one, (ii) in response to the step of receiving the token request, generating and sharing access and refresh token pairs so that a total number of the access and refresh token pairs equals the number of tokens required included in the token request, and (iii) sending the access and refresh token pairs to the client so that in response to token requests from the instances of the application, the instances of the application obtain respective access and refresh token pairs; or if the computer system does not issue the corresponding new refresh token for each request for the refresh of each access token, the computer system (iv) receiving from the client a request for a refresh token, (v) in response to the step of receiving the request for the refresh token, validating an existing access token which is bound to the refresh token, and (vi) in response to the step of validating, if the existing access token is expired, generating and sending to the client a new access token, or in response to the step of validating, if the existing access token is not expired, sending to the client the existing access token;

the computer system determining the existing access token is expired;

based on the computer system not issuing the corresponding new refresh token for each request for the refresh of each access token, and based on the existing access token being expired, the computer system invalidating the existing access token; and based on the new access token being sent to the client and the existing access token being invalidated, sharing a valid access token with each of the instances of the application, the valid access token being the new access token.

7. The computer system of claim 6, wherein the method implemented by the instructions being executed by the CPU further comprises the step of the computer system extending an Oath 2.0 authorization framework that enables the instances of the application to have access to a service, wherein the step of extending is a result of the steps of (i) receiving the token request from the client, (ii) generating and sharing the access and refresh token pairs, (iii) sending the access and refresh token pairs, (iv) receiving the request for a refresh token, (v) validating the existing access token and (vi) generating and sending the new access token if the existing access token is expired, or sending the existing access token if the existing access token is not expired.

8. The computer system of claim 6, wherein the method implemented by the instructions being executed by the CPU further comprises the step of accessing resources of a resource server using the new access token which is shared with each of the instances of the application.

9. The computer system of claim 6, wherein the method implemented by the instructions being executed by the CPU further comprises the step of based on the computer system issuing the corresponding new refresh token for each request for the refresh of each access token, the computer system receiving an authorization code in the token request, wherein the step of generating and sharing the access and refresh token pairs is based in part on the authorization code being received.

* * * * *